United States Patent Office 3,089,900
Patented May 14, 1963

3,089,900
PRODUCTION OF ALKYL METHACRYLATES USING ALKALI METAL HYDROXIDE CATALYST
James F. Vitcha, New Providence, and Victor A. Sims, Bayonne, N.J., assignors to Air Reduction Company, Incorporated, New York, N.Y., a corporation of New York
No Drawing. Filed June 29, 1961, Ser. No. 120,517
1 Claim. (Cl. 260—486)

This invention relates to the synthesis of methyl methacrylate. More particularly, it relates to an improved catalytic vapor phase synthesis of methyl methacrylate by condensing methyl propionate with formaldehyde.

Methyl methacrylate is used extensively in the manufacture of synthetic resinous polymers and because of a steadily increasing demand for methyl methacrylate, two recently patented processes are of particular interest, namely, Redmon U.S. Patent No. 2,734,074 and Etherington U.S. Patent No. 2,821,543.

The present invention constitutes an improvement over the prior art such as that represented by these two patents, and resides in the discovery of an improved process for obtaining methyl methacrylate which comprises contacting a vapor mixture of methyl propionate and formaldehyde with an alkali metal hydroxide catalyst selected from the group consisting of potassium hydroxide, rubidium hydroxide, and cesium hydroxide. More particularly, the catalysts which have been found to be particularly advantageous in the production of methyl methacrylate according to the present invention comprise any of the aforementioned alkali metal hydroxides in a concentration between about 0.25% and 3% by weight impregnated on silica gel.

The process by which methyl methacrylate is formed according to the process of the present invention may be represented by the following overall reaction:

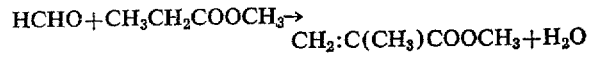

$$HCHO + CH_3CH_2COOCH_3 \rightarrow CH_2{:}C(CH_3)COOCH_3 + H_2O$$

which probably proceeds via the formation of an intermediate hydroxyester which then loses a molecular of water to yield the desired methyl methacrylate.

Various commercial sources of formaldehyde such as aqueous, alcoholic, or other solutions can be used in the practice of this invention in place of the pure anhydrous materials preferred by the prior art patentees noted above.

A number of catalysts and catalyst supports were investigated in a reaction system comprising a calibrated reservoir, metering pump, vaporizer, carburetor, preheater, catalyst tube, condensing system and wet test meter all connected in series. In operation a suitably proportioned mixture of vapors of methyl propionate and formaldehyde—and methanol and/or water vapor, when these were also present in the raw materials—was led through an electrically heated and insulated tube to a preheated tube having a temperature-controlled electrical heating jacket. The preheated vapors passed directly from the preheater to a catalyst-packed reactor tube wherein the temperature was maintained as uniform as possible. The vapors issuing from the discharge end of the reactor tube were led to a condensing system including cold traps and suitable apparatus to measure and analyze the off-gas.

Before each run the system was flushed with inert gas, then each unit was brought to the desired temperature, and the flow of the mixture of reactants into the apparatus was then initiated.

The methyl methacrylate is recovered from the condensate by fractional distillation under reduced pressure, or any other suitable technique.

The reaction proceeds best at about 325° to 425° C., and preferably at 350° to 400° C., using an excess of ester to formaldehyde and at space velocities over a wide range of about 200 to about 6000 liters/hour/liter of catalyst. In general, higher space velocities (i.e., shorter contact times) are used at the higher operating temperatures and pressures.

Ester/formaldehyde molar ratios varying over rather wide ranges from about 1:1 to about 50:1 may be employed, although best results are obtained at ratios of about 2.5:1 to about 15:1. Within this preferred range high conversions and yields are obtained without excessive dilution of the reaction product with unreacted methyl propionate. The reaction proceeds well as substantially atmospheric pressure, although one may resort to superatmospheric or subatmospheric pressures if desired. The use of pressure facilities recovery of methyl methacrylate. Generally no advantages are gained at pressures above 200 p.s.i.g. which are not also realized at lower pressures.

A catalyst consisting of potassium hydroxide, rubidium hydroxide, or cesium hydroxide impregnated on silica gel is a much more effective catalyst than other apparently closely related catalysts. Yields and conversions with sodium hydroxide or alkaline earth hydroxide catalysts are notably poorer than with catalysts of this invention. The yield of methyl methacrylate is very responsive to the amount of alkali metal hydroxide used. Very poor results are obtained when the alkali metal hydroxide is supported on carrier materials other than silica gel.

The process will now be described with respect to the specific examples which follow.

EXAMPLE 1

A gaseous mixture of methyl propionate and aqueous formaldehyde was passed through a catalyst bed at atmospheric pressures, a temperature of 375° C., and a space velocity of 200 to 250 liters/hour/liter of catalyst. The formaldehyde used was a commercial aqueous solution containing 36 to 38% HCHO, 10 to 15% methanol as a preservative, balance water. The catalyst consisted of potassium hydroxide impregnated on silica gel. The mole ratio of methyl propionate to formaldehyde, and the amount of potassium hydroxide in the catalyst in each run, are shown in Table I below. The percentage conversion and yield both based on formaldehyde, are also shown in Table I below.

Table I

| Run No. | Percent KOH on SiO₂ gel | Ester:HCHO Mole Ratio | Space Velocity | Percent Conv. | Percent Yield |
|---|---|---|---|---|---|
| 1 | 1.0 | 5:1 | 250 | 52 | 59 |
| 2 | 1.0 | 10:1 | 230 | 62 | 68 |
| 3 | 0.5 | 14:1 | 200 | 66 | 90 |
| 4 | 1.0 | 14:1 | 210 | 73 | 87 |
| 5 | 2.0 | 14:1 | 200 | 58 | 62 |
| 6 | 1.0 | 20:1 | 250 | 76 | 82 |

EXAMPLE 2

A gaseous mixture of methyl propionate and aqueous formaldehyde (36–38% HCHO plus 10–15% methanol as preservative) was passed through a catalyst consisting of 1% KOH impregnated on silica gel at a pressure of 100 p.s.i.g. and a temperature of 375° C. The reaction product was condensed. The mole ratio of methyl propionate to formaldehyde, space velocity, and percentage conversion and yield, both based on formaldehyde, are shown in Table II below.

Table II

| Run No. | Ester: HCHO Mole Ratio | Space Velocity | Percent Conv. | Percent Yield |
|---|---|---|---|---|
| 1 | 1:1 | 2,500 | 29 | 42 |
| 2 | 2.5:1 | 2,500 | 50 | 74 |
| 3 | 5:1 | 3,000 | 22 | 51 |
| 4 | 10:1 | 1,900 | 52 | 56 |
| 5 | 15:1 | 900 | 64 | 71 |
| 6 | 15:1 | 2,200 | 70 | 83 |
| 7 | 15:1 | 4,700 | 62 | 82 |
| 8 | 15:1 | 6,900 | 50 | 76 |

EXAMPLE 3

A gaseous mixture of methyl propionate and methanolic formaldehyde (55% HCHO in methanol) was passed through a catalyst consisting of 1% KOH impregnated on silica gel at atmospheric pressure. The reaction product was condensed. The mole ratio of methyl propionate to formaldehyde, temperature, and space velocity in each run are shown in Table III below. The conversion and yield, both based on formaldehyde, are also given in Table III.

Table III

| Run No. | Ester:HCHO Mole Ratio | Temp., °C. | Space Velocity | Percent Conv. | Percent Yield |
|---|---|---|---|---|---|
| 1 | 2.5:1 | 400 | 485 | 55 | 69 |
| 2 | 5:1 | 400 | 460 | 72 | 74 |
| 3 | 10:1 | 400 | 425 | 73 | 80 |
| 4 | 14:1 | 350 | 240 | 71 | 82 |
| 5 | 14:1 | 375 | 430 | 77 | 85 |
| 6 | 14:1 | 400 | 900 | 75 | 84 |
| 7 | 20:1 | 375 | 460 | 74 | 94 |

EXAMPLE 4

A gaseous mixture of methyl propionate and methanolic formaldehyde (55% HCHO) was passed through a catalyst consisting of 1% KOH impregnated on silica gel at a pressure of 100 p.s.i.g. and a temperature of 375° C. The reaction product was condensed. The mole ratio of methyl propionate to formaldehyde, space velocity, percentage conversion and yield, both based on formaldehyde, are shown in Table I below.

Table IV

| Run No. | Ester:HCHO Mole Ratio | Space Velocity | Percent Conv. | Percent Yield |
|---|---|---|---|---|
| 1 | 2.5:1 | 2,600 | 41 | 62 |
| 2 | 5:1 | 2,200 | 67 | 82 |
| 3 | 10:1 | 2,100 | 71 | 80 |
| 4 | 15:1 | 800 | 64 | 68 |
| 5 | 15:1 | 1,500 | 70 | 75 |
| 6 | 15:1 | 2,000 | 72 | 79 |
| 7 | 15:1 | 4,200 | 66 | 80 |
| 8 | 15:1 | 6,000 | 55 | 75 |
| 9 | 15:1 | 8,100 | 45 | 75 |

EXAMPLE 5

The procedure of Example 3 was followed, except that the catalyst was 1% rubidium hydroxide impregnated on silica gel. Results are shown in Table V below.

Table V

| Run No. | Ester:HCHO Mole Ratio | Temp., °C. | Space Velocity | Percent Conv. | Percent Yield |
|---|---|---|---|---|---|
| 1 | 2.5:1 | 400 | 500 | 50 | 81 |
| 2 | 5:1 | 400 | 450 | 60 | 81 |
| 3 | 10:1 | 400 | 415 | 83 | 91 |
| 4 | 10:1 | 375 | 415 | 64 | 88 |

EXAMPLE 6

The procedure of Example 3 was followed, except that the catalyst was 1% cesium hydroxide impregnated on silica gel. Results are shown in Table VI below.

Table VI

| Run No. | Ester:HCHO Mole Ratio | Temp., °C. | Space Velocity | Percent Conv. | Percent Yield |
|---|---|---|---|---|---|
| 1 | 5:1 | 400 | 530 | 56 | 85 |
| 2 | 10:1 | 375 | 490 | 52 | 100 |
| 3 | 20:1 | 400 | 365 | 65 | 100 |

The catalysts used in Examples 1 to 4 consisting of 1% KOH on silica gel were prepared as follows: 2.4 parts of 87% KOH were dissolved in 90 parts of water and then poured onto 200 parts of 6/16 mesh silica gel particles with vigorous stirring. The resulting mass was warmed while mixing and the heat was gradually increased over a two-hour period, after which it was then placed in a forced air oven and left there for three hours at 375° C. The fines were screened from the resulting product and discarded. Other catalysts according to this invention are similarly prepared, using the appropriate quantities of KOH, RbOH, or CsOH.

While preferred embodiments of this invention have been described in the foregoing examples, it is to be understood that the invention may be practiced under conditions which vary considerably from those described. Thus, it is to be understood that the process described herein may be modified to a considerable extent without departing from the spirit of the invention which is not intended to be limited except as required by the appended claims.

We claim:

A process for the production of methyl methacrylate which comprises forming a vapor mixture of methyl propionate and formaldehyde having a mole ratio of methyl propionate to formaldehyde within the range of 5:1 to 15:1, passing said vapor mixture over a fixed bed catalyst in a reaction chamber at a temperature of from 325° C. to 425° C. at a pressure not exceeding 200 pounds per square inch gauge and with a space velocity of from 200 to 6000 liters per hour per liter of catalyst, said catalyst consisting of potassium hydroxide impregnated on silica gel wherein said potassium hydroxide is present within the range of from 0.5% to 2% by weight, thereafter recovering a reaction product vapor mixture containing methyl methacrylate and separating the said methyl methacrylate from the reaction product so formed.

References Cited in the file of this patent

UNITED STATES PATENTS 2,821,543    Etherington _____ Jan. 28, 1958

UNITED STATES PATENT OFFICE
CERTIFICATE OF CORRECTION

May 14, 1963

Patent No. 3,089,900

James F. Vitcha et al.

It is hereby certified that error appears in the above numbered patent requiring correction and that the said Letters Patent should read as corrected below.

Column 1, line 43, for "molecular" read -- molecule --; column 2, line 16, for "as" read -- at --; line 19, for "facilities" read -- facilitates --; line 38, for "pressures" read -- pressure --; column 3, Table III, in the last column under "Percent Yield", the first two figures reading "69" and "74" read -- 64 --, and -- 79 --; same column, line 47, for "Table I" read -- Table IV --.

Signed and sealed this 10th day of December 1963.

(SEAL)
Attest:

ERNEST W. SWIDER
Attesting Officer

EDWIN L. REYNOLDS

Acting Commissioner of Patents